United States Patent Office 3,585,103
Patented June 15, 1971

---

3,585,103
PRIMING COMPOSITION COMPRISING A COUPLING AGENT AND A POLYFUNCTIONAL AZIDE FOR BONDING POLYMERS TO GLASS, METAL AND METAL OXIDE SUBSTRATES
J. Brent Thomson, Wilmington, Del., assignor to Hercules Incorporated, Wilmington, Del.
No Drawing. Filed Sept. 23, 1968, Ser. No. 761,848
Int. Cl. B32b 15/04, 17/06
U.S. Cl. 161—191
19 Claims

ABSTRACT OF THE DISCLOSURE

It has been found that polymers can be made to adhere more firmly to glass, metal and metal oxides by first conjointly treating the substrate with (1) a coupling agent selected from the group consisting of organosilanes, ethylenically unsaturated carboxylic acid chromium chloride complexes, unsaturated carboxylic acids and anhydrides, and unsaturated organophosphorus compounds, and (2) a polyfunctional azide. A polymer may be bonded to the thus treated glass, metal or metal oxide immediately after such treatment or at some later date.

---

This invention relates to a method of improving the adhesion of polymers to various substrates. More particularly, this invention relates to a method of improving the adhesion of polymers to glass, metal and metal oxides through the conjoint use of a coupling agent and a polyfunctional azide compound.

It is known in the art to coat various objects with polymers. However, many polymers, and in particular the nonpolar ones, are difficult to bond strongly to glass, metal and metal oxide substrates. Other polymers which form a bond with these substrates in the absence of moisture lose their adherence when subjected to moist conditions.

It has now been found that the adhesion of various polymers to glass, metal and metal oxide substrates can be greatly improved by the conjoint treatment of the substrates with (1) a coupling agent selected from the group consisting of organosilanes, ethylenically unsaturated carboxylic acid chromium chloride complexes, unsaturated carboxylic acids and anhydrides, and unsaturated organophosphorus compounds; and (2) a polyfunctional azide having the general formula

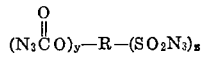

where R is an organic radical, y is an integer from 0 to 10, z is an integer from 0 to 10 and the sum of y+z is an integer from 2 to 10. Not only does the treatment in accordance with this invention increase the adhesion of the polymer to the glass, it also greatly improves wet strength retention.

Various polymers can be bonded to glass, metal or metal oxides in accordance with this invention. Exemplary of the most preferred polymers which can be so bonded are the hydrocarbon polymers including saturated, unsaturated, linear, atactic, crystalline or nonlinear amorphous polymers, copolymers, terpolymers, etc., as for example, polyethylene, polypropylene, polystyrene, styrene butadiene rubber, butyl rubber, natural rubber, polybutadiene, polyisobutylene, ethylene-propylene copolymer, cis-1,4-polyisoprene, ethylene-propylene dicyclopentadiene terpolymer, etc. and blends of these polymers with each other. In addition to hydrocarbon polymers, other polymers which can be so bonded are poly(ethylene terephthalate); poly(alkylene oxides) such as poly(methylene oxide), poly(ethylene oxide), and poly(propylene oxide), etc.; vinyl chloride polymers containing at least 10 mole percent of vinyl chloride such as poly(vinyl chloride), vinyl chloride-vinyl acetate copolymers, vinyl chloride-vinylidene chloride copolymers, vinyl chloride-vinylidene chloride-acrylonitrile terpolymers, etc.; poly(vinylidene chloride); poly(ethyl acrylate); acrylonitrile copolymers such as vinylidene chloride-acrylonitrile copolymers, butadiene-acrylonitrile copolymers, styrene-acrylonitrile copolymers, etc.

As stated above, the process of this invention involves the conjoint treatment of the substrate to which the polymer is to be bonded with a coupling agent and a polyfunctional azide compound. The coupling agents which can be used in accordance with this invention are, as stated above, the organosilanes, ethylenically unsaturated carboxylic acid chromium chloride complexes, unsaturated carboxylic acids and anhydrides, and unsaturated organophosphorus compounds. The most preferred organosilanes are the ethylenically unsaturated silanes such as vinyl trichlorosilane, vinyl triacetoxysilane, γ-methacryloxypropyltrimethoxysilane, allyltrimethoxysilane, 2-butenyltrimethoxysilane, 5-hexenyltrimethoxysilane, 2,5-dimethyl-5-hexenyltrimethoxysilane, the trimethoxysilyl propyl ester of monoallyl maleate, vinyl methyl dichlorosilane, vinyl triethoxysilane, etc. In addition to ethylenically unsaturated silanes, the aromatic silanes such as β-phenylethyltrimethoxysilane, phenyltrimethoxysilane, p-(trimethoxysilylethyl)styrene, etc., and saturated organosilanes such as amyltrichlorosilane and γ-aminopropyltrimethoxysilane can be used. Exemplary unsaturated carboxylic acids are acrylic acid, maleic acid, vinyl acetic acid, allyl acetic acid, fumaric acid, mesaconic acid, citraconic acid, cinnamic acid, crotonic acid, isocrotonic acid, phthalic acid, phthalic anhydride, maleic anhydride, itaconic acid, etc. Exemplary unsaturated organophosphorus compounds are ethylenically unsaturated organophosphorus compounds, such as allyl diethyl phosphonate, hexenyl diethyl phosphonate and undecenyl diethyl phosphonate, aromatically unsaturated organophosphorus compounds, such as triphenylphosphine oxide, dichlorophenylphosphine, phenylphosphinic acid, diphenylphosphonyl chloride, etc.

The polyfunctional azide compounds which can be used in accordance with this invention have the general formula

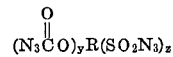

where R, y and z are as defined above. Exemplary of the polyfunctional azides are the polyazidoformates wherein R is alkylene, as for example in ethylene bis(azidoformate), trimethylene bis(azidoformate), tetramethylene bis(azidoformate), pentamethylene bis(azidoformate), hexamethylene bis(azidoformate), 1,9-nonane-bis(azidoformate), 1,10-decane-bis(azidoformate), etc.; cycloalkylene, as for example in cyclohexylene-1,2-bis (azidoformate), cyclohexylene - 1,3 - bis(azidoformate), and cyclohexylene - 1,4 - bis(azidoformate); arylene, as for example in o-, m-, and p-phenylene bis(azidoformate); arylene-dialkylene, as for example in o-, m-, and p-xylylene bis(azidoformate); alkylene-diarylene, as for example in 2,2 - isopropylidene - bis(p,p' - phenylazidoformate); cycloalkylene-dialkylene, as for example in 1,4-cyclohexanedimethyl bis(azidoformate); oxydialkylene, as for example in 2,2' - oxydiethyl bis(azidoformate), 2,2' - oxydipropyl bis(azidoformate); thiodialkylene, as for example in 2,2'-thiodiethyl bis(azidoformate), 4,4'-thiodibutyl bis(azidoformate); alkylene poly(oxyalkylene), as for example in 2,2'-ethylenedioxyethyl bis(azidoformate), i.e., ethylene bis(oxyethylene azidoformate), the tris(azidoformate) of glycerol-propylene oxide adduct; alkylene-bis(polyoxyalkylene), as for example the bis(azidoformates) of poly(ethylene glycol) and poly- (propylene glycol), and carbyl tetrakis (alkyleneoxyalkylene), as for example in the tetraazidoformate of pentaerythritolpropylene oxide adduct having the formula

the polysulfonazides including the alkylene polysulfonazides such as 1,5 - pentane bis(sulfonazide), 1,10 - decane bis(sulfonazide), etc., the cycloalkylene polysulfonazides such as 1,4-cyclohexane bis(sulfonazide), 1,5-cycloheptane bis(sulfonazide), etc., the arylene polysulfonazides such as 1,3 - benzene bis(sulfonazide), 1 - octyl - 2,4,6-benzene tris(sulfonazide), 4,4' - diphenylmethane bis(sulfonazide), α,α' - m - xylene bis(sulfonazide), 4,4' - diphenylether bis(sulfonazide), 4,4' - bis[octadecylbiphenyl-3,5,3',5' - tetra(sulfonazide)], 4,4' - diphenyldisulfide bis(sulfonazide), 1,6 - bis(4' - sulfonazido phenyl) hexane, 2,7 - naphthylene bis(sulfonazide), etc.; the polysulfonazides of chlorinated aliphatic and cyclic hydrocarbons, etc.; and the mixed polyazides including the alkylene mixed polyazides such as 3-azidosulfonylpropyl azidoformate, 5 - azidosulfonylpentamethylene azidoformate, 9 - azidosulfonylnonane azidoformate, 10 - azidosulfonyldecane azidoformate, etc.; the cycloalkylene mixed polyazides such as 3 - azidosulfonylcyclohexyl azidoformate, 4 - azidosulfonylcyclooctyl azidoformate, etc.; the alkylene-cycloalkylene mixed polyazides such as β-azidosulfonyl - 3 - ethylcyclohexyl azidoformate, γ - azidosulfonyl-3 - propylcyclohexyl azidoformate, etc.; the arylene mixed polyazides such as o-, m-, and p-azidosulfonylphenyl azidoformate, 3-azidosulfonylnaphthyl azidoformate, etc.; the alkarylene mixed polyazides such as β-azidosulfonyl-p-ethylphenyl azidoformate, etc.; the aralkylene mixed polyazides such as m-azidosulfonylbenzyl azidoformate, p-azidosulfonylphenethyl azidoformate, etc.; the alkylene diarylene mixed polyazides such as p-(p'-azidosulfonylbenzyl) phenyl azidoformate, p-(p'-azidosulfonylphenethyl) phenyl azidoformate, etc.; the alkylene-oxy-alkylene mixed polyazides such as 4(3-azidosulfonylpropoxy)-n-butyl azidoformate, etc.; the arylene-oxyarylene mixed polyazides such as p(p'-azidosulfonylphenoxy)phenyl azidoformate, etc.; the alkylene-oxy-arylene mixed polyazides such as m(2-azidosulfonylethoxy)phenyl azidoformate, etc.; the alkylene-thio-alkylene mixed polyazides such as 5(3 - azidosulfonylpropylmercapto) - n - pentamethylene azidoformate, etc.; the arylene-thio-arylene mixed polyazides such as p(p' - azidosulfonylphenylmercapto) phenyl azidoformate, etc.; the arylene-sulfonyl-arylene mixed polyazides such as p(p' - azidosulfonylphenylsulfonyl)phenyl azidoformate, etc. It will, of course, be obvious to those skilled in the art that still other polyfunctional azides containing groups, which are inert to the bonding reactions of this invention, such as halogen, COOR,

etc., groups are included in the above definition.

The polyfunctional azides recited above can be prepared from the corresponding polychloroformates, polychlorosulfonyls, and mixed chloroformate-chlorosulfonyl compounds by reacting the chlorinated intermediate with an alkali metal azide. The reaction can be carried out in a wide variety of solvents at a temperature within the range of from about 0° to about 100° C.

The process of this invention can be carried out in various ways. For example, the substrate can be coated with a solution or suspension of the coupling agent, allowed to dry, then coated with a solution or suspension of the polyfunctional azide, allowed to dry and finally contacted with the polymer at the decomposition temperature of the azide. By another method, the substrate can be coated with a solution or suspension of the coupling agent, allowed to dry, then contacted with a solution or mixture of both the polyfunctional azide and the polymer and finally heated to the decomposition temperature of the azide. By still another method, the coupling agent, polyfunctional azide and polymer can be deposited together on the substrate and then heated to the decomposition temperature of the azide. No matter which method is used, it will be necessary to heat the polyfunctional azide to initiate the bonding reaction. The temperature at which bonding is effected can be varied over a wide range, depending upon the specific azide employed. In general, however, the temperature will be in the range of from about 70° C. to about 350° C. In the case of mixed polyazides, i.e., compounds containing two or more different azide groups, the reaction can be carried out sequentially since various azide groups decompose at different temperatures. For example, a polyfunctional azide compound containing both sulfonazide and azidoformate groups can be reacted with a coupling agent through the azidoformate groups at a low temperature. Since the sulfonazide groups have a negligible decomposition rate at low temperatures, they remain to react with the polymer at a higher temperature. Various amounts of coupling agents and polyfunctional azides can be used depending upon the specific agents and azides, the surface area to be covered, the polymer to be bonded to the substrate, etc. In general, the coupling agents will be employed in the form of solutions which can be sprayed, brushed or poured over the surface of the substrate. Alternatively, the object can be dipped into a solution of the coupling agent. The coupling agents are soluble in various solvents including the ketones such as acetone, methyl ethyl ketone, etc., the alcohols such as methanol, ethanol, isopropyl alcohol, butanol, diacetone alcohol, etc., the chlorinated solvents such as methylene chloride, carbon tetrachloride, trichloroethylene, chlorobenzene, etc., the aromatic solvents such as benzene, toluene, xylene, etc., tetrahydrofuran, etc., and will generally be used in concentrations of from about 0.02% to about 15%. Most desirably, an amount of polyfunctional azide will be used so that there is at least one azide group to react with each molecule of coupling agent. This will constitute a ratio of at least one mole of polyfunctional azide to each mole of coupling agent bound to the substrate. In practice more than one mole of azide to each mole of coupling agent will generally be used.

It will be obvious to those skilled in the art that the process of this invention can be utilized to improve the adhesion of polymers to glass, metal and metal oxides having a variety of useful purposes. For example, this process can be used to improve the flexural strength of glass fiber or glass cloth reinforced polymers. In one modification of this invention glass fibers used to reinforce polymers can be dipped in a solution of the coupling agent in the nascent state (i.e. right after they come from the spinnerettes). They can then be reacted with a mixed polyazide at a temperature at which substantially only the azidoformate groups react, thus leaving the sulfonazide groups to react at a later time with the polymer. The process of this invention can also be used to increase the strength of safety glass where sheets of glass plate are bonded to a polymer core. In another modification of this invention, metal objects, such as metal cans, can be coated with a solution of the coupling agent, then treated with a mixed polyazide at one temperature and then coated with a polymer at a slightly higher temperature. It will be readily apparent to those skilled in the art that the process of this invention lends itself to any occurrence where polymers are bonded to glass, metal and metal oxides.

The following examples will illustrate the invention, all parts and percentages being by weight unless otherwise indicated.

EXAMPLE 1

Twelve (12) ply laminates of glass cloth and polypropylene film were prepared using 181 style electrical glass woven cloth, heat cleaned and having a weight of 8.9 ounces per square yard, and 5 mil film of crystalline polypropylene. Sheets of the glass cloth were first immersed in a 1% aqueous solution of γ-methacryloxypropyltrimethoxy silane and then dried at a temperature of 60° C. for 2 hours. The thus treated cloth was immersed in a perchloroethylene solution containing 0.5% by weight of tetramethylene bis(azidoformate) and 5% by weight of crystalline polypropylene and heated to a temperature of 120° C. for two hours. The cloth sheets were removed from the perchloroethylene solution, dried in a vacuum oven at 60° C. overnight and then laid up to form the laminate by alternating plies of the treated glass cloth and sheets of the polypropylene film. The resulting assembly was compression molded at a temperature of 220° C., for 7 minutes at contact pressure, 3 minutes at a pressure of 440 p.s.i. and then cooled to 23° C. under 440 p.s.i. to form a ⅛" thick laminate. A control laminate was prepared exactly as described above except the treatment with the γ-methacryloxypropyltrimethoxy silane and tetramethylene bis (azidoformate) was omitted. Test specimens 1 inch by 3 inches were cut from the laminates and tested for flexural strength according to American Standard Testing Method D790 in a 2 inch span at 0.05 inch/minute crosshead speed. The laminate prepared from the treated cloth had a flexural strength of 40,600 p.s.i. while the control had a flexural strength of 14,100 p.s.i. Even after boiling in distilled water for 72 hours the laminate prepared from the treated cloth retained 96% of its flexural strength or 39,200 p.s.i.

EXAMPLE 2

A 12 ply laminate of glass cloth and polypropylene film was prepared using the glass cloth and polypropylene film described in Example 1. The sheets of glass cloth were immersed in a solution of γ-methacryloxypropyltrimethoxy silane and dried as described in Example 1. The silane treated cloth was then immersed in an ethylene chloride solution containing 1% by weight of 1,9-nonane bis(sulfonazide) for 2 hours, removed and dried. The cloth picked up about 1% of the bis(sulfonazide) by weight based on the weight of the glass. An assembly of alternate plies of the treated cloth and sheets of polypropylene film was laid up. The resulting assembly was compression molded at a temperature of 220° C. under a pressure of 250 p.s.i. to a ⅛ inch thick laminate. A control laminate was prepared exactly as described above except the treatment with γ-methacryloxypropyltrimethoxy silane and 1,9-nonane bis (sulfonazide) was omitted. Test specimens 1 inch by 3 inches were cut from the laminates and tested for flexural strength according to the American Standard Testing Method described above. The laminate prepared from the treated cloth had a flexural strength of 26,000 p.s.i. while the control had a flexural strength of 14,000 p.s.i.

EXAMPLE 3

A 12 ply laminate of glass cloth and polypropylene was prepared using the glass cloth and polypropylene film described in Example 1. The sheets of glass cloth were immersed in a 1% aqueous solution of vinyltriacetoxy silane and then dried at a temperature of 23° C. for 16 hours. The silane treated cloth was then immersed in a 0.14% tetrachloroethylene solution of 3-azidocarbonyloxypropyl sulfonylazide and heated to a temperature of 121° C. for 1½ hours to decompose the azidoformate groups of the diazido compound. Since the sulfonazide groups have a negligible decomposition rate at 121° C., approximately 80% of the groups remained intact. An assembly of alternate plies of the treated cloth and sheets of the polypropylene film were laid up. The resulting assembly was compression molded at a temperature of 220° C. under a pressure of 500 p.s.i. to a ⅛ inch thick laminate. A control laminate was prepared exactly as described above except the treatment with the vinyltriacetoxy silane and 3-azidocarbonyloxypropyl sulfonylazide was omitted. Test specimens 1 inch by 3 inches were cut from the laminates and tested for flexural strength as described in Example 1. The laminate prepared from the treated cloth had a flexural strength of 19,210 p.s.i. while the control had a flexural strength of 13,740 p.s.i.

EXAMPLE 4

A 12 ply laminate of glass cloth and polypropylene was prepared using the glass cloth and polypropylene film described in Example 1. The sheets of glass cloth were immersed in a 0.5% acetone solution of acrylic acid and then dried under vacuum at 50° C. The thus treated cloth was immersed in a perchloroethylene solution containing 1% by weight of tetramethylene bis(azidoformate) and 0.1% by weight of crystalline polypropylene and heated to a temperature of 121° C. for 1½ hours. The cloth sheets were removed from the perchloroethylene solution and dried in a vacuum oven at 50° C. An assembly of alternate plies of the treated cloth and sheets of the polypropylene film was laid up. The resulting assembly was compression molded using the following cycle: 7 minutes at 220° C. under contact pressure, 5 minutes at 220° C. under 200 p.s.i. and cooled to 20° C. under 200 p.s.i. A control laminate was prepared exactly as described above except the treatment with tetramethylene bis(azidoformate) was omitted. Test specimens ½ inch by 3 inches were cut from the laminates and tested in accordance with American Standard Testing Method D–790 for flexural strength and flexural modulus both before and after boiling for 72 hours in distilled water. The results of these tests are tabulated below:

|  | Dry flexural | | After boiling 72 hours | |
|---|---|---|---|---|
|  | Strength, p.s.i. | Modulus, p.s.i.× $10^{-5}$ | Flexural strength, p.s.i. | Modulus, p.s.i.× $10^{-5}$ |
| Treated | 16,440 | 2.3 | 12,870 | 1.7 |
| Control | 13,500 | 2.0 | 10,640 | 1.6 |

EXAMPLES 5–6

Laminates of glass cloth and polypropylene film were prepared and tested as described in Example 4 except acetone solutions of phthalic anhydride in Example 5 and triphenylphosphine oxide in Example 6 were substituted for the acetone solution of acrylic acid used in Example 4. The results of the tests on the thus produced laminates are tabulated below:

|  | Dry flexural | | After boiling 72 hours | |
|---|---|---|---|---|
|  | Strength, p.s.i. | Modulus, p.s.i.× $10^{-5}$ | Flexural strength, p.s.i. | Modulus, p.s.i.× $10^{-5}$ |
| Example 5 | 18,450 | 2.1 | 13,030 | 1.3 |
| Example 6 | 18,520 | 2.1 | 13,230 | 1.8 |

EXAMPLE 7

A 12 ply laminate of glass cloth and polypropylene film was prepared using the polypropylene film described in Example 1 and a commercially woven glass cloth as described in Example 1 which had been treated with methacrylato chromium chloride complex so as to have a chromium level of 0.03–0.06% by weight of complex based on the weight of the glass. The procedure was the same as described in Example 4. The resulting laminate and a control laminate prepared from the chromium complex treated cloth but omitting the tetramethylene bis(azidoformate) were tested as described in Example 4. The results of these tests are tabulated below:

|  | Dry flexural | |
|---|---|---|
|  | Strength, p.s.i. | Modulus, p.s.i.× $10^{2-5}$ |
| Treated | 34,240 | 2.4 |
| Control | 14,400 | 2.2 |

EXAMPLES 8–9

Twelve (12) ply laminates of glass cloth and polypropylene film were prepared as described in Example 4 except 1% acetone solutions of dichlorophenyl phosphine in Example 8 and phenyl phosphinic acid in Example 9 were substituted for the acetone solution of acrylic acid used in Example 4. The results of the tests on the thus produced laminates are tabulated below:

|  | Dry flexural | | After boiling 72 hours | |
| --- | --- | --- | --- | --- |
|  | Strength, p.s.i. | Modulus, p.s.i.× $10^{-6}$ | Flexural strength, p.s.i. | Modulus, p.s.i.× $10^{-6}$ |
| Example 8 | 17,290 | 1.7 | 13,430 | 1.6 |
| Control | 14,630 | 1.7 | 11,180 | 1.3 |
| Example 9 | 15,720 | 1.6 | 13,630 | 1.1 |
| Control | 11,370 | 1.3 | 10,600 | 1.2 |

EXAMPLE 10

A 12 ply laminate of glass cloth and mixed polymers was prepared using the glass cloth described in Example 1. The sheets of glass cloth were immersed in a hot perchloroethylene sizing solution containing 2% by weight of polystyrene, 1% by weight of γ-aminopropyltrimethoxysilane and 0.25% by weight of 1,9-nonane bis(sulfonylazide), removed, and dried overnight in a vacuum oven at 60° C. The thus treated sheets were heated at 160° C. for 20 minutes. The sized sheets were then immersed in an acetone solution containing 0.5 weight percent 1,9-nonane bis(sulfonylazide) for 10 minutes, removed, and air-dried for 20 minutes, followed by drying in a vacuum oven at 40° C. for 2 hours. An assembly of alternating plies of the sized glass cloth and 5 mil polypropylene film was laid up. The resulting assembly was compression molded at a temperature of 220° C. for 6 minutes at contact pressure, 3 minutes at 500 p.s.i. and then cooled to 23° C. under 500 p.s.i. The resulting laminate had a flexural strength of approximately 23,000 p.s.i.

EXAMPLE 11

A 12 ply laminate of glass cloth and polyethylene was prepared using the glass cloth described in Example 1. The sheets of glass cloth were treated as described in Example 4 except a 1% acetone solution of allyldiethylphosphonate was substituted for the acetone solution of acrylic acid used in Example 4. The thus treated cloth was immersed in a perchloroethylene solution containing 1% by weight of tetramethylene bis(azidoformate), 2% by weight polyethylene and heated to a temperature of 121° C. for 1½ hours. The cloth sheets were removed from the perchloroethylene solution and dried in a vacuum oven at 50° C. An assembly of alternate plies of the treated cloth and 5 mil sheets of high density polyethylene was laid up. The resulting assembly was compression molded at 177° C. for 6 minutes at contact pressure, 4 minutes at 400 p.s.i. and then cooled to 23° C. under 400 p.s.i. The resulting laminate had a flexural strength similar to the laminate in Example 6.

EXAMPLE 12

A 12 ply laminate of glass cloth and a styrene-acrylonitrile copolymer containing 10% by weight of acrylonitrile was prepared using the glass cloth described in Example 1. The sheets of glass cloth were immersed in an acetone solution containing 1% by weight γ-methacryloxypropyltrimethoxysilane, 1.5% by weight 1,9-nonane bis(sulfonylazide) and 4% by weight of the styrene-acrylonitrile copolymer, removed, and dried overnight at room temperature. The thus treated cloth was heated to 220° C. for 4 minutes and then cooled. An assembly of alternate plies of the treated cloth and 5 mil sheets of the styrene-acrylonitrile copolymer was laid up. The resulting assembly was compression molded at 204° C. for 6 minutes at contact pressure, 4 minutes at 350 p.s.i. and then cooled to 23° C. under 350 p.s.i. A control laminate was prepared exactly as described above except the cloth was not treated with the sulfonylazide. The flexural strength of the treated laminate was approximately 30% greater than the control.

EXAMPLE 13

A 12 ply laminate of glass cloth and polystyrene was prepared using the glass cloth described in Example 1. A treated and control sample were prepared as described in Example 12 with polsytyrene substituted for the styrene-acrylonitrile copolymer. The flexural strength of the treated laminate was about 30% greater then the control.

EXAMPLE 14

A 12 ply laminate of glass cloth and a poly(ethyleneterephthalate-ethylenehexahydroterephthalate), prepared with 15% by weight hexahydrodimethylterephthalate, was prepared using the glass cloth described in Example 1. The sheets of glass cloth were immersed in a methylene chloride solution containing 2% γ-methacryloxypropyltrimethoxysilane, 1.5% 1,9-nonane bis(sulfonylazide), and 5% of the copolymer. The sheets were removed from the solution and dried overnight at room temperature. The thus treated cloth was heated to 250° C. for 3 minutes and then cooled. An assembly of alternate plies of the treated cloth and 5 mil sheets of the terephthalate copolymer was laid up. The resulting assembly was compression molded at 250° C. for 6 minutes at contact pressure, 3 minutes at 250° C. under 400 p.s.i., cooled to 135° C. under 400 p.s.i., held at 135° C. for 1 hour under 400 p.s.i., and then cooled to 23° C. under 400 p.s.i. A control laminate was prepared exactly as described above except the cloth was not treated with the sulfonylazide. The fleuxural strength of the treated laminate was approximately 25% greater than the control. Even after boiling in water for 18 hours, the flexural strength of the treated laminate was substantially better than the control.

EXAMPLE 15

A 12 ply laminate of glass cloth and polyoxymethylene was prepared using the glass cloth described in Example 1. The sheets of glass cloth were immersed in a 1% aqueous solution of γ-methacryloxypropyltrimethoxysilane, removed and dried at room temperature overnight. The sheets were then immersed in a solution of perchloroethylene containing 2% 3 - azidocarbonyloxypropyl sulfonylazide and heated to a temperature of 121° C. for 1½ hours. The thus treated sheets were removed from the perchloroethylene solution and dried in a vacuum oven at 50° C. An assembly of alternate plies of the treated cloth and 6 mil sheets of polyoxymethylene was laid up. The resulting assembly was compression molded at 220° C. for 4 minutes at contact pressure, 3 minutes under 340 p.s.i. and then cooled to 23° C. under 340 p.s.i. A control laminate was prepared exactly as described above except the cloth was not treated with the mixed azido compound. The flexural strength of the treated laminate was approximately 30% greater than the control.

EXAMPLE 16

A 12 ply laminate of glass cloth and polypropylene was prepared using the glass cloth and polypropylene film described in Example 1. A treated and control sample were prepared as described in Example 15 with polypropylene substituted for the polyoxymethylene and a 50/50 methylene chloride/methanol solution containing 1% of amyltrichlorosilane substituted for the aqueous solution of γ-methacryloxypropyltrimethoxysilane. The flexural strength of the treated laminate was about 30% greater than the control.

EXAMPLE 17

A 12 ply laminate of glass cloth and poly(vinyl chloride) was prepared using the glass cloth described in Example 1. The sheets of glass cloth were immersed in a 1% aqueous solution of γ-methacryloxypropyltrimethoxysilane, removed and dried at room temperature overnight. The sheets were then immersed in a solution of perchloroethylene containing 2% 3-azidocarbonyloxypropyl sulfonylazide and heated to a temperature of 121° C. for 1 hour. The thus treated sheets were removed and dried in a vacuum oven at 50° C. An assembly of alternate plies of the treated cloth and 5 mil sheets of poly(vinyl chloride) was laid up. The resulting assembly was compression molded at 193° C. for 15 minutes at contact pressure, 3 minutes under 440 p.s.i. and then cooled to 23° C. under 440 p.s.i. A control laminate was prepared exactly as described above except the cloth was not treated with the mixed azido compound. The flexural strength of the treated laminate was approximately 20% greater than the control.

EXAMPLE 18

This example shows the bonding of a polymer to glass plates by first treating the plates with a silane and azido compound.

Glass microscopic slides were treated by dipping in a methylene chloride solution containing 2% phenyltrimethoxysilane, 1% tetramethylene bis(azidoformate) and 5% poly(ethyl acrylate) and then dried for 1 hour at 50° C. Samples were cut from a 20 mil sheet of poly(ethyl acrylate) and placed between the glass slides so that the slides overlapped approximately ¼ inch. Each assembly was molded in a hydraulic press at 205° C. for 8 minutes under contact pressure and 4 minutes at a pressure sufficient to obtain a 0.025 inch glue line. In each case the assembly was placed in a jig with spacers during the molding to maintain a 0.025 inch glue line. Control samples were prepared exactly the same way except the glass slides were not treated with the bisazidoformate. The samples were placed in water at an angle of 45° and the water heated to 60° C. The samples were held in the water at this temperature until the bonds failed. The treated samples withstood exposure to the water for an average of about 40% longer than the controls.

EXAMPLE 19

This example shows the bonding of a polymer to aluminum panels by first treating the panels with a silane and azido compound.

Aluminum panels 1 x 4 inches and 1/16 inch thick were cleaned, degreased with trichloroethylene vapor, etched with dilute chromic acid and washed with distilled water. Each panel was treated by dipping in a methanol-water solution containing 0.02 g./ml. of γ-methacryloxypropyltrimethoxysilane. After drying, the panels were coated to a 10 mil thickness with a colloidal suspension containing 2% 1,9-nonane bis(sulfonylazide), 20 to 22% crystalline polypropylene particles, having an average particle size within the range of 0.02 to 0.5 micron, and a small amount of stabilizer in a mixed aliphatic hydrocarbon solvent. Control panels were coated the same way except the suspension contained no sulfonylazide. The thus coated panels were baked at 195° C. for 5 minutes. The panels were assembled for lap shear strength tests by placing a 10 mil plaque of polypropylene between two aluminum panels so that the panels overlapped aproximately ½ inch. Each assembly was molded in a hydraulic press at 230° C. for 3 minutes under contact pressure, 6 minutes under 400 p.s.i., and cooled to 23° C. under 400 p.s.i. In each case the assembly was placed in a jig during the molding to maintain a 0.025 inch glue line. Each sample was then tested for lap shear strength. The treated samples were approximately 25% stronger than the controls.

EXAMPLE 20

This example shows the bonding of a polymer to steel panels by first treating the panels with an unsaturated organophosphorous compound and azido compound.

Iron phosphate treated steel panels were cleaned and degreased with trichloroethylene vapor. Each panel was treated by dipping in a 1% aqueous solution of phenyl phosphinic acid. After drying the panels were coated exactly as described in Example 19. The panels were baked and assembled for lap shear strength tests also as described in Example 19. Testing showed that the treated samples were approximately 25% stronger than the controls.

What I claim and desire to protect by Letters Patent is:

1. A process of improving the adhesion of a polymer to a substrate selected from the group consisting of glass, metal, and metal oxides, which comprises contacting the substrate with (1) a coupling agent which will adhere strongly to the substrate and is selected from the group consisting of organosilanes, selected from ethylenically unsaturated organosilanes, saturated organosilanes and aromatic organosilanes; ethylenically unsaturated carboxylic acid chromium chloride complexes; unsaturated carboxylic acids and anhydrides, selected from ethylenically unsaturated carboxylic acids and anhydrides and aromatically unsaturated carboxylic acids and anhydrides; and unsaturated organophosphorus compounds, selected from ethyleniclly unsaturated organophosphorus compounds and aromatically unsaturated organophosphorus compounds; (2) the said polymer; and (3) a polyfunctional azide, at least one azide group of which will react with one of the coupling agents adhered to the substrate, having the general formula

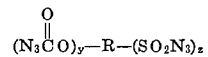

where R is an organic radical inert to bonding reactions, y is an integer from 0 to 10, z is an integer from 0 to 10 and the sum of y+z is an integer from 2 to 10 and heating the thus contacted substrate to decompose the azide groups.

2. The process of claim 1 wherein the substrate is first contacted with the coupling agent.

3. The process of claim 1 wherein the polymer, coupling agent, and polyfunctional azide are all deposited together on the substrate.

4. The process of claim 1 wherein the polymer is a polyolefin.

5. The process of claim 1 wherein the coupling agent is γ-methacryloxypropyltrimethoxysilane.

6. The process of claim 1 wherein the coupling agent is a methacrylato chromium chloride complex.

7. The process of claim 1 wherein the polyfunctional azide is tetramethylene bis(azidoformate).

8. The process of claim 1 wherein the polyfunctional azide is 1,9-nonane bis(sulfonylazide).

9. The process of claim 1 wherein the polyfunctional azide is 3-azidocarbonyloxypropylsulfonylazide and the reaction is carried out sequentially.

10. An article of manufacture comprising a polymer bonded to a substrate through a coupling agent and a polyfunctional azide, where said substrate is selected from the group consisting of glass, metal and metal oxides; said coupling agent is selected from the group consisting of organosilanes, selected from ethylenically unsaturated organosilanes, saturated organosilanes and aromatic organosilanes; ethylenically unsaturated carboxylic acid chromium chloride complexes, unsaturated carboxylic acids and anhydrides, selected from ethylenically unsaturated carboxylic acids and anhydrides and aromatically unsaturated carboxylic acids and anhydrides; and unsaturated organophosphorus compounds, selected from ethylenically unsaturated organophosphorus compounds and aromatically unsaturated organophosphorus compounds; and said polyfunctional azide has the general formula

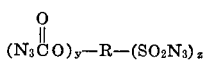

where R is an organic radical inert to bonding reactions, y is an integer from 0 to 10, z is an integer from 0 to 10 and the sum of y+z is an integer from 2 to 10.

11. The article of claim 10 wherein the polymer is bonded to glass.

12. The article of claim 11 wherein the polymer is glass reinforced.

13. The article of claim 10 wherein the polymer is bonded to metal.

14. The article of claim 10 wherein the polymer is a hydrocarbon polymer.

15. The article of claim 14 wherein the polymer is polypropylene.

16. An article of manufacture comprising a substrate selected from the group consisting of glass, metal, and metal oxides primed by conjoint treatment with (1) a coupling agent which will adhere strongly to the substrate and is selected from the group consisting of organosilanes, selected from ethylenicaly unsaturated organosilanes, saturated organosilanes and aromatic organosilanes; ethylenically unsaturated carboxylic acid chromium chloride complexes; unsaturated carboxylic acids and anhydrides, selected from ethylenically unsaturated carboxylic acids and anhydrides and aromatically unsaturated carboxylic acids and anhydrides; and unsaturated organophosphorus compounds, selected from ethylenicaly unsaturated organophosphorus compounds and aromatically unsaturated organophosphorus compounds; (2) a polyfunctional azide at least one azide group of which will react with one of the coupling agents adhered to the substrate, having the general formula

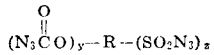

where R is an organic radical inert to bonding reactions, $y$ is an integer from 0 to 10, $z$ is an integer from 0 to 10 and the sum of $y+z$ is an integer from 2 to 10.

17. The article of claim 16 wherein the substrate is glass.

18. A composition for priming a substrate selected from the group consisting of glass, metal and metal oxides to which a polymer is to be adhered, comprising (1) a coupling agent which will adhere strongly to the substrate and is selected from the group consisting of organosilanes, selected from ethylenically unsaturated organosilanes, saturated organosilanes and aromatic organosilanes; ethylenically unsaturated carboxylic acid chromium chloride complexes; unsaturated carboxylic acids and anhydrides, selected from ethylenically unsaturated carboxylic acids and anhydrides and aromatically unsaturated carboxylic acids and anhydrides; and unsaturated organophosphorus compounds, selected from ethylenically unsaturated organophosphorus compounds and aromatically unsaturated organophosphorus compounds; (2) a polyfunctional azide, at least one azide group of which will react with one of the coupling agents adhered to the substrate, having the general formula

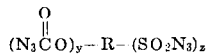

where R is an organic radical inert to bonding reactions, $y$ is an integer from 0 to 10, $z$ is an integer from 0 to 10 and the sum of $y+z$ is an integer from 2 to 10; and (3) liquid dispersing medium.

19. The composition of claim 18 comprising a solution of the coupling agent and polyfunctional azide in an inert organic solvent.

References Cited

UNITED STATES PATENTS

| | | | |
|---|---|---|---|
| 3,211,752 | 10/1965 | Broslow | 260—349 |
| 3,261,785 | 7/1966 | Robinson | 260—349 |
| 3,284,421 | 11/1966 | Broslow | 260—80.5 |
| 3,298,975 | 1/1967 | Feild | 260—349 |
| 3,352,946 | 11/1967 | Dew | 260—349 |
| 3,398,210 | 8/1968 | Pleuddemann et al. | 161—193 |
| 3,440,302 | 4/1969 | Speier | 161—193 |
| 3,443,620 | 5/1969 | Vanderbilt et al. | 161—193 |

HAROLD ANSHER, Primary Examiner

D. J. FRITSCH, Assistant Examiner

U.S. Cl. X.R.

117—75, 79, 124, 126, 135.1; 156—314, 326; 161—193, 207, 208, 213; 252—188.3